(12) United States Patent
Anthony et al.

(10) Patent No.: US 8,095,892 B2
(45) Date of Patent: *Jan. 10, 2012

(54) GRAPHICAL USER INTERFACE FOR 3-DIMENSIONAL VIEW OF A DATA COLLECTION BASED ON AN ATTRIBUTE OF THE DATA

(75) Inventors: Colin Ray Anthony, Kirkland, WA (US); Stephane St-Michel, Woodinville, WA (US); Zeke Book Odins-Lucas, Seattle, WA (US); Jordan Luther King Schwartz, Seattle, WA (US); Richard Malcolm Banks, Egham (GB); Marcus Simmon Howell Harvey, Seattle, WA (US); Charles Cummins, Seattle, WA (US); Charles W. Stabb, Seattle, WA (US); Mark Richard Ligameri, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 952 days.

This patent is subject to a terminal disclaimer.

(21) Appl. No.: 11/145,954

(22) Filed: Jun. 7, 2005

(65) Prior Publication Data

US 2005/0289482 A1 Dec. 29, 2005

Related U.S. Application Data

(63) Continuation of application No. 10/691,441, filed on Oct. 23, 2003, now Pat. No. 6,990,637.

(51) Int. Cl.
*G06F 3/048* (2006.01)

(52) U.S. Cl. .......... 715/851; 715/788; 715/848
(58) Field of Classification Search ........... 715/712, 715/713, 767, 798, 838, 851
See application file for complete search history.

(56) References Cited

U.S. PATENT DOCUMENTS

| 5,283,864 | A | 2/1994 | Knowlton |
| 5,303,388 | A | 4/1994 | Kreitman et al. |
| 5,644,692 | A | 7/1997 | Eick |
| 5,911,138 | A | 6/1999 | Li et al. |
| 6,202,061 | B1 * | 3/2001 | Khosla et al. ............ 707/3 |
| 6,243,091 | B1 | 6/2001 | Berstis |
| 6,246,406 | B1 | 6/2001 | Nielsen et al. |
| 6,414,677 | B1 | 7/2002 | Robertson et al. |

(Continued)

OTHER PUBLICATIONS

MyLifeBits: Fullfilling the memex vision, Jim Gemmell et al., pp. 1-4, ACM Dec. 2002.*

(Continued)

*Primary Examiner* — Tadeese Hailu
*Assistant Examiner* — Haoshian Shih
(74) *Attorney, Agent, or Firm* — Shook, Hardy & Bacon L.L.P.

(57) ABSTRACT

A three-dimensional (3D) view of a data collection based on an attribute is disclosed. A timeline is provided for displaying files and folders. The timeline may include a focal group that displays detailed information about its contents to the user. Remaining items on the timeline are displayed in less detail and may be positioned to appear further away from the user. A histogram may be provided as part of the view to allow the user to more easily navigate the timeline to find a desired file or folder.

20 Claims, 12 Drawing Sheets

U.S. PATENT DOCUMENTS

| | | | |
|---|---|---|---|
| 6,466,237 B1 * | 10/2002 | Miyao et al. | 715/838 |
| 6,486,895 B1 | 11/2002 | Robertson et al. | |
| 6,493,006 B1 | 12/2002 | Gourdol et al. | |
| 6,545,687 B2 | 4/2003 | Scott et al. | |
| 6,570,582 B1 | 5/2003 | Sciammarella et al. | |
| 6,667,751 B1 | 12/2003 | Wynn et al. | |
| 6,983,424 B1 * | 1/2006 | Dutta | 715/800 |
| 6,996,782 B2 * | 2/2006 | Parker et al. | 715/764 |
| 7,051,291 B2 * | 5/2006 | Sciammarella et al. | 715/838 |
| 2003/0030673 A1 | 2/2003 | Ho | |

OTHER PUBLICATIONS

Baker et al., A New Model for Algorothm Animation Over the WWW, ACM Computing Surveys, Dec. 1995, vol. 27 Issue 4, pp. 568-572, ACM Press, New York.

* cited by examiner

|  | 902 | 904 | 906 |
|---|---|---|---|
| C | INTERVAL | LABEL FORMAT |
| 908 — <= 1 HOUR | QUARTER HOURS | HH:MM (am/pm)$_1$ - HH:MM (am/pm)$_2$ |
| 910 — > 1 HOUR; <= 24 HOURS | HOURS | HH:MM (am/pm)$_1$ - HH:MM (am/pm)$_2$ |
| 912 — >24 HOURS; <= 7 DAYS | DAYS | [MONDAY, TUESDAY...] |
| 914 — >7 DAYS; <= 31 DAYS | WEEKS | [MONTH$_1$ DAY$_1$ - MONTH$_2$ DAY$_2$] |
| 916 — >31 DAYS; <= 365 DAYS | MONTHS | [MONTH$_1$ YEAR$_1$ - MONTH$_2$ YEAR$_2$] |
| 918 — >365 DAYS | YEARS | [YEAR$_1$ - YEAR$_2$] |

FIG. 9

GRAPHICAL USER INTERFACE FOR 3-DIMENSIONAL VIEW OF A DATA COLLECTION BASED ON AN ATTRIBUTE OF THE DATA

CROSS-REFERENCE TO RELATED CASES

This application is a continuation of co-pending application Ser. No. 10/691,441, filed Oct. 23, 2003, of the same title.

FIELD OF THE INVENTION

The invention relates generally to computer generated graphical user interfaces. More specifically, the invention provides systems and methods for enabling a user to more efficiently view, find and select a group of objects in a graphical user interface.

BACKGROUND OF THE INVENTION

Current computer systems use graphical user interfaces (GUIs) to allow users to effectively utilize the computer system without having to learn a complex command language. An innovation of the GUI is the ability to allow users to visually organize files, folders and other objects more easily through the use of file manager programs such as Windows® Explorer. As used herein, the term file manager refers to any computer program or aspect of a computer program that is used to organize and display files or representations thereof.

Recent innovations in visual technologies such as the widespread availability of digital cameras have made the graphical capabilities of an operating system more important than ever before. Digital photograph images are often stored on the hard drives of personal computers rather than on film or photographic paper. Many consumers prefer taking photographs with digital cameras because it is not necessary to develop a roll of film in order to view the photographs. Rather, the photographic images need only be downloaded from the camera onto a personal computer hard disk where they are stored in some picture file format (e.g. .jpg, .tif, .gif, and the like) and can be viewed and manipulated through the GUI using various application programs that either come preinstalled on the operating system or are value-added software products (e.g., DIGITAL IMAGE PRO, by Microsoft Corporation of Redmond, Wash.) that a user installs on top of the operating system (hereinafter OS).

As hard disk space becomes less expensive, users are able to store increasing numbers of photographic images (and other types of computer image files) on the hard drive of their computers. Because of the increased number of images, it has become more difficult for users to manage and organize the graphics files that contain the images. For example, in a folder with hundreds of picture files it can be difficult to find a particular image file. This is especially the case where the filename is not indicative of the contents of the picture file.

One way that users attempt to organize their picture files is by renaming them in such as way as to indicate the contents of the image contained in them. This method has certain drawbacks. First, where a user has hundreds or even thousands of photographs, he or she must take the time to rename each and every file to describe the contents of the picture or photograph it contains. This renaming process involves viewing each file to understand its contents and then typing a new name for the file. For hundreds or thousands of pictures, this method is impractical because it could take hours or even days.

A technique that has been employed in the prior art to enable users to more easily navigate, organize and view picture files is the use of a "thumbnail" view, illustrated in FIG. 2. A thumbnail typically refers to a representation of the contents of a file encapsulated in an icon or other image of a size smaller than the original image size that is displayed in a file listing environment. Although the use of thumbnails provides the user with a visual indication of the contents of each file, in a folder that contains many files, it may still be difficult to locate a desired file.

Other techniques have been used to more effectively allow the user to organize, locate and access picture files in a folder. For example, some known file managers allow the user to designate an ordering property that allows them to place the items in a file or folder in some particular sorted order, illustrated in FIG. 3. For example, a user could configure the file manager to sort the files in a folder by date/time so that they are listed in chronological order. The user could also configure the file manager to sort the files in alphabetical order by file name or file type. When the user configures the file manager is this way, the entire content of the folder are ordered in a two-dimensional array based on the selected sorting criterion.

Although these techniques are useful in organizing smaller grouping of files and folders, as the number of files increases, these techniques become less and less effective. Thus, there is a need for an improved way to organize and display files that overcomes these and other limitations found in the prior art.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, aspects of the present invention are directed to a computer-implemented method for displaying items on a GUI.

According to an aspect of the present invention, the items are first placed in some logical order using an attribute shared by each of the items. The items are then divided into groups based on an interval that is either selected by the user or determined by the system based on some algorithm. One of the groups is designated as a focal group, and is displayed at a primary point of focus in the GUI. The remaining groups are displayed on either side of the focal group based on their ordering.

Another aspect of the invention provides for the items to be displayed in a three-dimensional appearing graphical environment such that the remaining groups appear to be less prominent to the user than the focal group.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 9 illustrates a chart with calculations that may be used in practicing aspects the present invention according to an illustrative embodiment.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

The present invention provides methods and systems that allow computer users to more easily organize, find and access files. By providing a graphical user interface that utilizes an organizing principle that is simple for users to understand and at the same time giving a rich visual experience, the invention improves significantly on known file management techniques.

Illustrative Operating Environment

Figure 1:
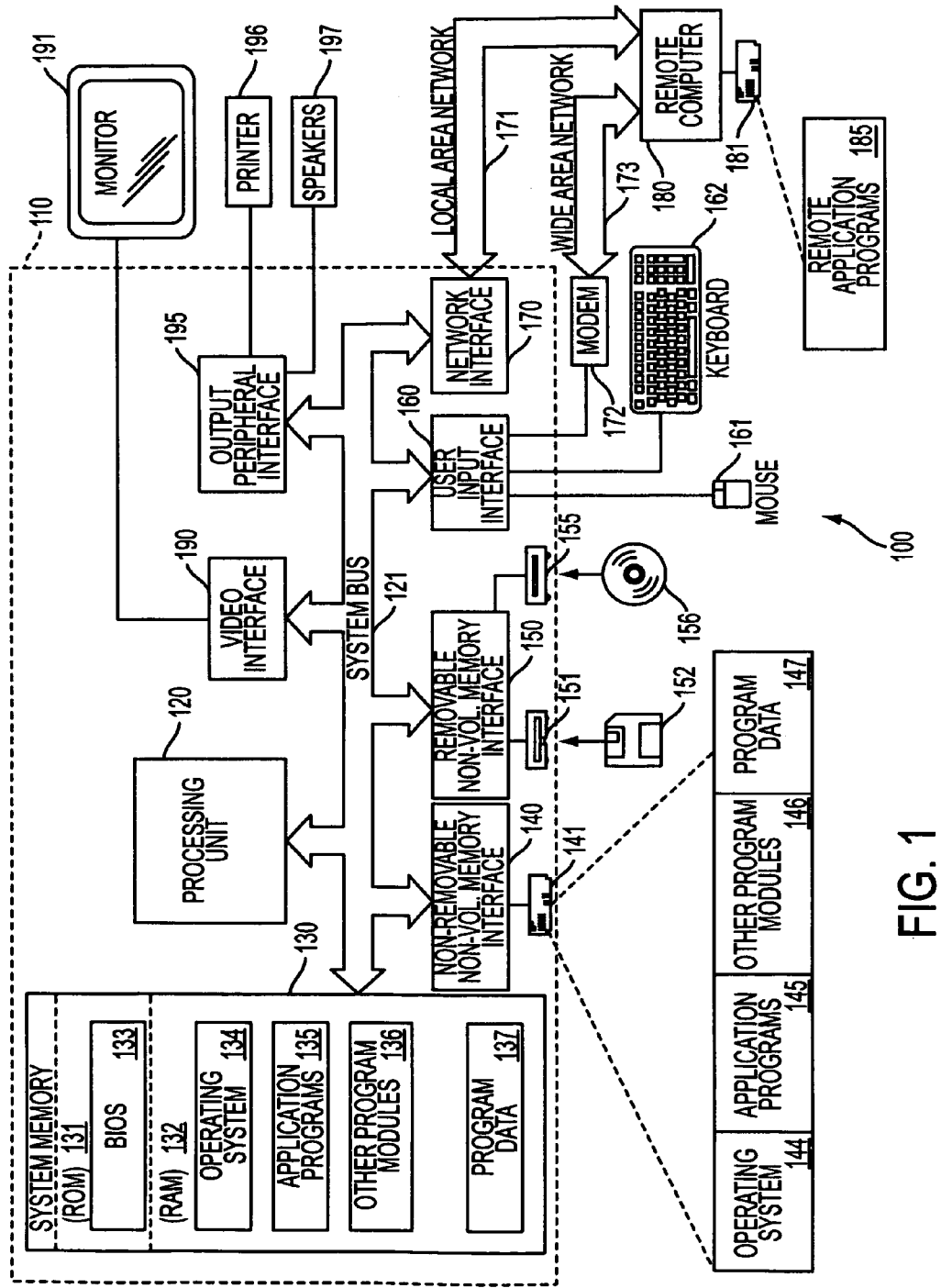
FIG. 1 illustrates a schematic diagram of an exemplary general-purpose computing environment that may be used to implement various aspects of the present invention.
Figure 2:
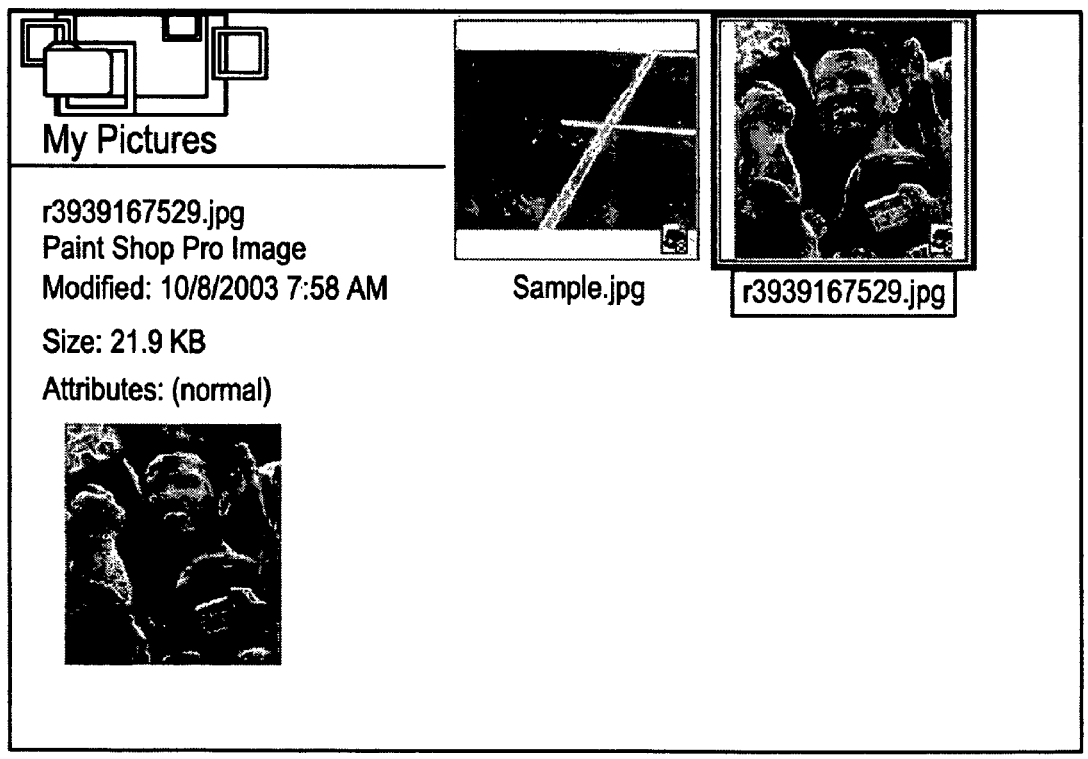
FIG. 2 illustrates prior art file management program that allows a thumbnail view of files.
Figure 3:
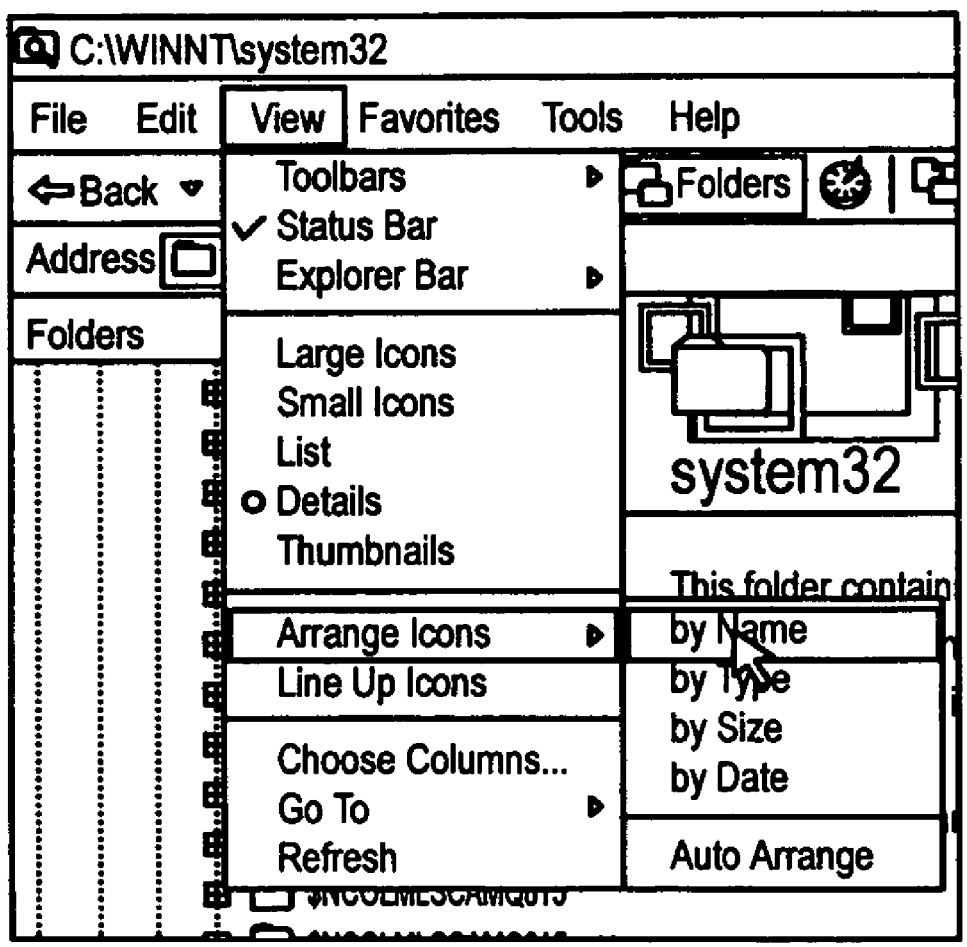
FIG. 3 illustrates a prior art file management program that allows the user to specify an ordering property for the contents of the active file folder.

FIG. 1 illustrates an example of a suitable computing system environment 100 in which one or more aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. Computer 110 may also include a digitizer 192 for use in conjunction with monitor 191 to allow a user to provide input using a stylus input device 193. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

DESCRIPTION OF ILLUSTRATIVE EMBODIMENTS

Figure 4:
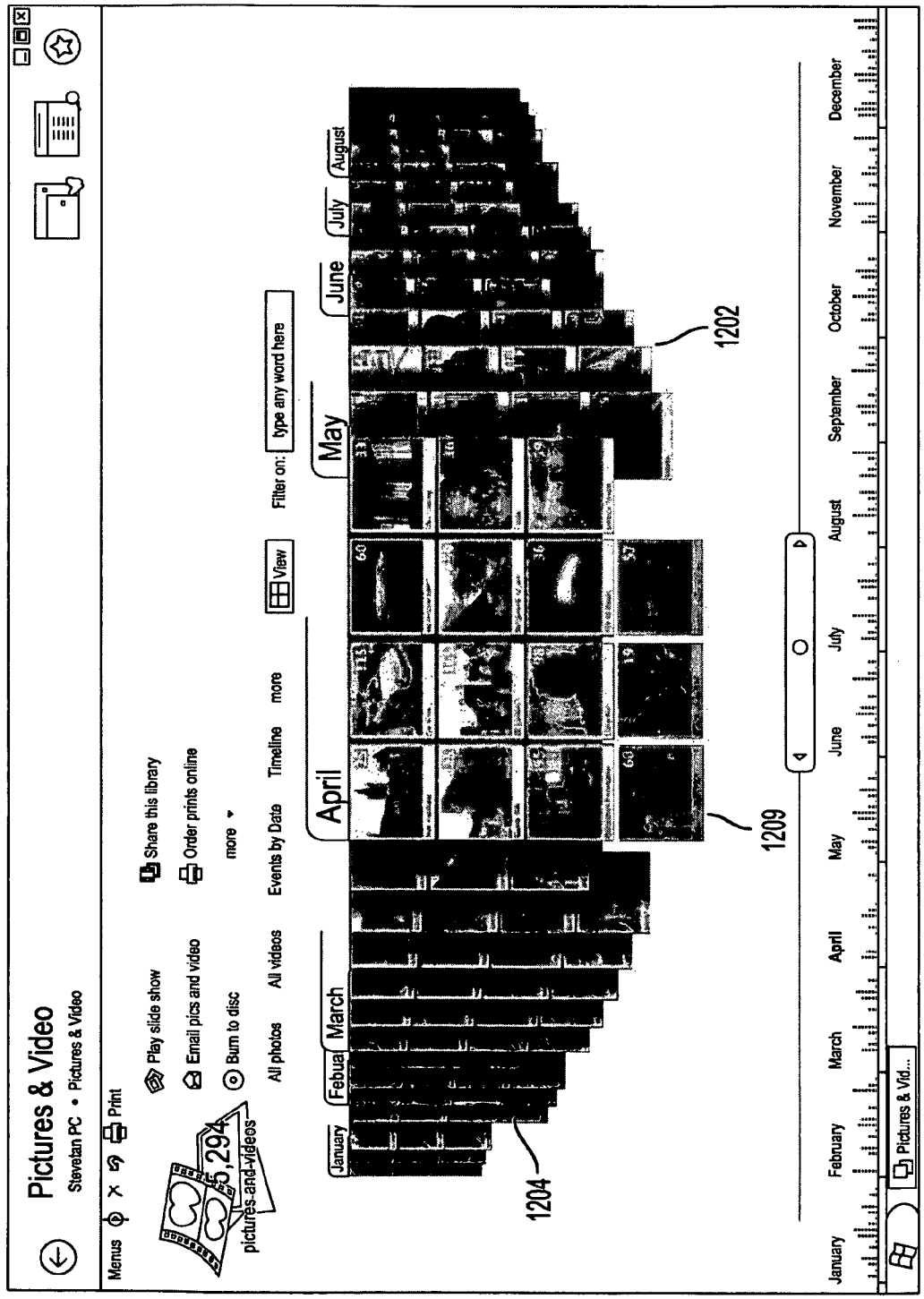
FIG. 4 illustrates an illustrative embodiment of the present invention.

Generally, all items stored in an operating system have certain properties (e.g. a time attribute) ascribed to them. The term "item" is herein defined as a visual representation of a file, folder, virtual folder, or any other data object that may be stored in an operating system and/or file system, for example, icons, thumbnails, and the like. The items in the file system and/or operating system may be stored on any desirable storage location on computer 110. For example, the items may be stored on hard drive 141, or on removable non-volatile magnetic disk 152, or on optical disk 156, or even possibly on remote computer 180 accessed over local area network 171 or wide area network 173. Attributes or properties of items include attributes or properties of the files, folders, or virtual folders, etc., that they represent and may further include aspects of the visual representation itself. For example, item properties may include, but are not limited to, name, file size, date of creation, modified date, author, title, read-only, archived, hidden, personal, type, and the like. Any item property may be used as an ordering attribute according to various aspects of the present invention. As used herein, the term "ordering attribute" refers to the attribute around which data is primarily sorted or organized at a given time. For example, a user may wish to group items by item type, or author, or some other attribute. In one embodiment of the present invention, the ordering attribute may be based on time, thus arranging the items chronologically, e.g., by using a date of creation or date of edit attribute as the ordering attribute. Items may be grouped in chronological order in a logical timeline in such a way as to allow a user to easily navigate and locate items. The items may then be presented to the user in a way that reflects this timeline. Such a presentation to the user is herein referred to herein as a "dynamic timeline view." An illustrative embodiment of a dynamic timeline view is shown in FIG. 4. It will be appreciated by those of skill in the art that other attributes may be used as the ordering attribute to sort and present data according to various aspects of the invention, and that a dynamic timeline view is merely an illustrative example for descriptive purposes.

A dynamic timeline view allows a user to view a set of items arranged chronologically and presented in a GUI environment. The GUI may take many forms. In one embodiment, three dimensional (3D) graphics technology may be used to provide the dynamic timeline view in a 3D environment. The 3D environment may be implemented utilizing graphics technology such as DirectX®, Direct3D®, OpenGL®, GDI, a media integration layer, or some other presentation platform as is known in the art. In some embodiments, 3D objects (which contain 3D properties) may be utilized to provide the 3D effect, while in other embodiments, graphics tools could be used to produce icons in a two dimensional (2D) environment that appear 3D but do not have 3D properties.

Figure 5:
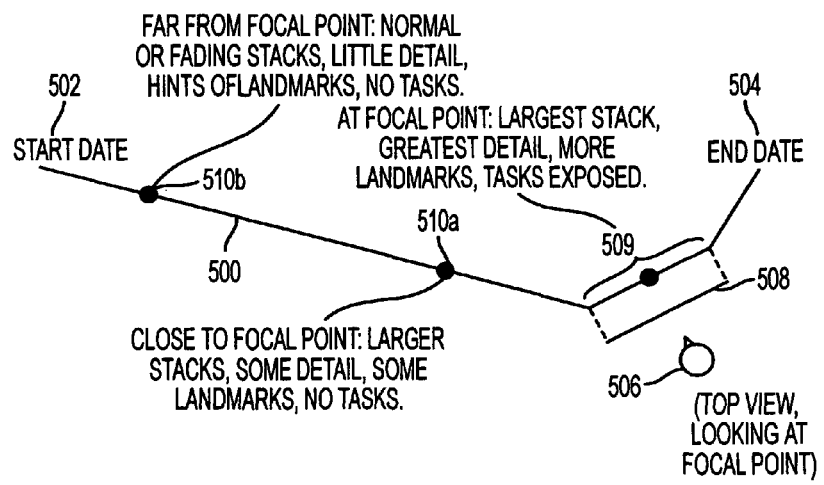
FIG. 5 illustrates a top-level schematic of various aspects of the present invention according to an illustrative embodiment.

Aspects of the present invention allow a user to freely navigate documents, files, or other data objects in a chronological manner, and allow the user to change the point of focus to an arbitrary location on a timeline. Based on the number of items in a set on which the user is focused (e.g., the number of photographs taken in August 2003), the system may adjust the dynamic timeline view in order to provide an improved browsing experience. In adjusting the dynamic timeline view, a series of animating steps may be used to enhance the richness of the user experience. FIG. 5 illustrates a top view schematic of a 3D dynamic timeline view interface. A timeline 500 has a start date 502 and an end date 504. The timeline 500 may include various time intervals (e.g., days, months, years, etc., not called out in FIG. 5). According to an aspect of the invention, the point of view of the GUI may be based on a conceptual camera 506 pointed at the time interval containing the files or objects on which the user wishes to focus. This time range is called the focal point 508 or focal point interval. The focal point 508 may represent a point in time or an interval of time on the timeline 500. Items that are within the time range covered by the focal point are collectively called the focal group 509. Items in the focal group 509 are typically presented to the user in greater detail than is shown for items in other time intervals on the timeline 500. Items in other time intervals on timeline 500 are grouped together in non-focal groups 510. Some non-focal groups 510 may be located close in time to the focal point 509. Referring again to FIG. 5, a first non-focal group 510a is shown on the time line 500 in a position relatively near the focal point 508. Items in this group may be shown with some detail, but possibly less than the level of detail provided for those items in the focal group 509. Another non-focal group 510b is shown that is positioned farther away on the timeline 500 relative to the focal point 508. Items in non-focal groups relatively farther from the focal group 509 may be shown with very little detail, and may be smaller relative to the items in both those non-focal groups 510a that are closer in time to the focal point 508, as well as the focal group 509 itself. The smaller appearance may be produced automatically when a 3D rendering technology is used, or may be simulated in 2D by drawing the items smaller.

Focal Group

Figure 6:
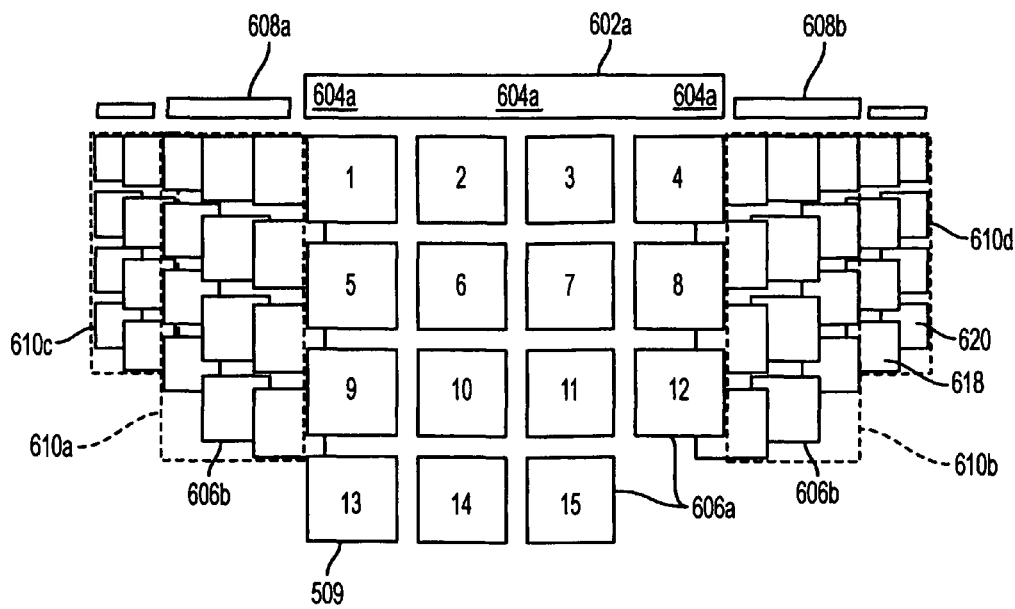
FIG. 6 illustrates another schematic showing a top view of an illustrative embodiment of the present invention.

FIG. 6 illustrates a presentation of items in a focal group and various non-focal groups in accordance with one or more aspects of the present invention. A focal group 509 may be made up of an array of focal group icons 606a (the numbered rectangular boxes) that represent items in the focal group 509. These icons may be traditional icons, thumbnail icons, 3D thumbnail icons, or any other GUI representation of items as is known in the art. While fifteen focal group icons 606a are illustrated in FIG. 6, if a sixteenth item were added to the focal group 509, it would be depicted as a sixteenth icon 606a inside of the focal group 509. Icons 606a in the focal group 509 may be presented as folders or as single items.

If an icon is a folder, double clicking on the folder will open the folder in a new dynamic timeline view (or other ordered view according to the present invention) to show the items stored in it. It can be appreciated by one of skill in the art that in addition to folders, items may be stored in other logical groupings such as virtual folders or stacks. If an icon 606a in the focal group 509 represents a file, double-clicking the file will cause the system to attempt to open the file.

The GUI according to the present invention presents the icons 606a numbered 1-15 representing items in the focal group 509 to appear closer to the user than items not in the focal group, as is illustrated in FIG. 6. Above the focal group may be a focal group header 602a that provides information regarding the contents of the focal group. In one embodiment, the focal group header 602a may have a label 604a and may be the width of the largest row in the focal group 509. In another embodiment of the present invention, the focal group header 602a may be smaller or larger than the width of the largest or in the focal group 509.

Figure 7:
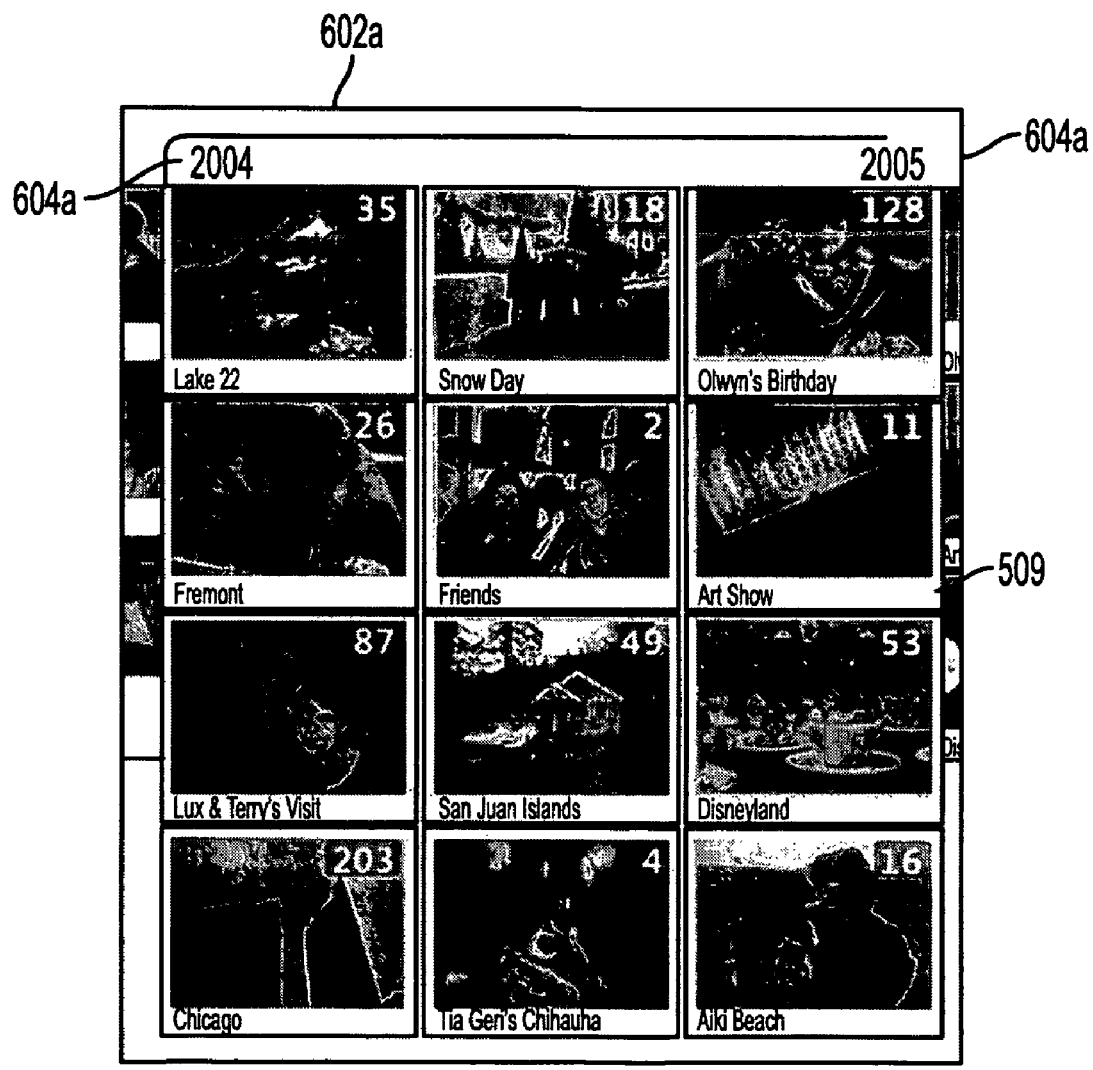
FIG. 7 illustrates a close up screenshot of a focal group with a view according to an illustrative embodiment of the present invention.

The label 604a located in the focal group header 602a may depend on the ordering principle. The label 604a may include the starting point for the focal group interval range on the left side and the end point for the focal group interval range on the right. For example, if the ordering attribute is time and there are files in the folder with a timeline 500 that extends over several years, then the header bar may simply include a starting month and/or year on the left and an ending month and/or year on the right. Referring to FIG. 7, an embodiment of a focal group 509 is shown with a focal group header 602a that contains a beginning year on the left side and an ending year on the right. These labels may indicate to the user that the content of the focal group is dated sometime between Jan. 1, 2004 and Dec. 31, 2005. If the timeline covers only a short period of time, the focal group header 602a may contain a label 604a in the form of Month$_1$ Day$_1$ on the left and Month$_2$ Day$_2$ on the right. In some embodiments, the focal group header 602a will contain only one item in the center. For example, if the ordering attribute were file type, the focal group header 602a might contain a label that simply says, "Excel Spreadsheets" or some other file type as is known in the art. Or, in another embodiment, if a timeline 500 has a range of more than a day but less than a week, the focal group header 602a may just contain the day of the week (e.g. "Monday"). While the label 604a preferably includes a description of the ordering attribute of the items in the focal group, each focal group header 602a may include any label 604a that describes the contents of the focal group.

As discussed above, the views provided by the GUI are similar to what one would see if a conceptual camera moved along the files and folders placed in the timeline 500. In one aspect of the present invention, the conceptual camera is always positioned such that all of the items in the focal group 509 can be seen. Thus, the conceptual camera provides for a "zooming" effect that allows the focal group 509 to always remain fully visible in the foreground, more prominently displayed, while the non-focal groups recede to the background, less prominently displayed on either side of the focal group, according to the ordering attribute. To aid a user's navigation of the timeline, it may be preferable to limit the amount of space that the focal group 509 can capture in a given view. Because there may be many non-focal groups 510 present, if the focal group 509 becomes too large, then the ability to show the non-focal groups 510 in any detail may become compromised. Therefore, in some embodiments the focal group 509 may be limited to a predetermined width, e.g., a range between fifty and seventy percent of the total width of the display in which the dynamic timeline view appears. In other aspects of the present invention, icons might be limited in size to fall within a predetermined icon size range. This range could be based on pixel size or on some other criterion. For example, in an illustrative embodiment, the interface may establish a minimum icon size of 24 pixels by 24 pixels or a maximum icon size of 192 pixels by 192 pixels on a 96 dpi (dots per inch) screen. For higher or lower dpi screens, these minimum and maximum icon size requirements may be increased or decreased as applicable. Thus, although there generally is not a limitation on the number of icons that may be displayed in the focal group, in some embodiments, in order to aid usability of the user interface, the above-referenced icon size and screen width limitations result in focal groups having a maximum number of group members.

Figure 8A:
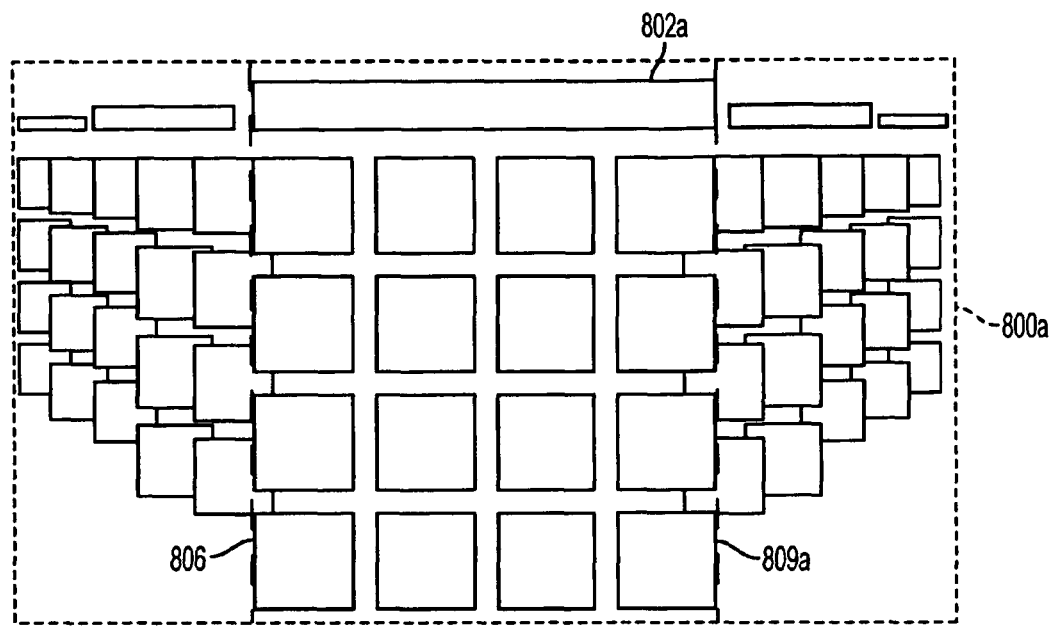
FIGS. 8a and 8b illustrate the handling of large and small focal groups according to an illustrative embodiment of the present invention.
Figure 8B:
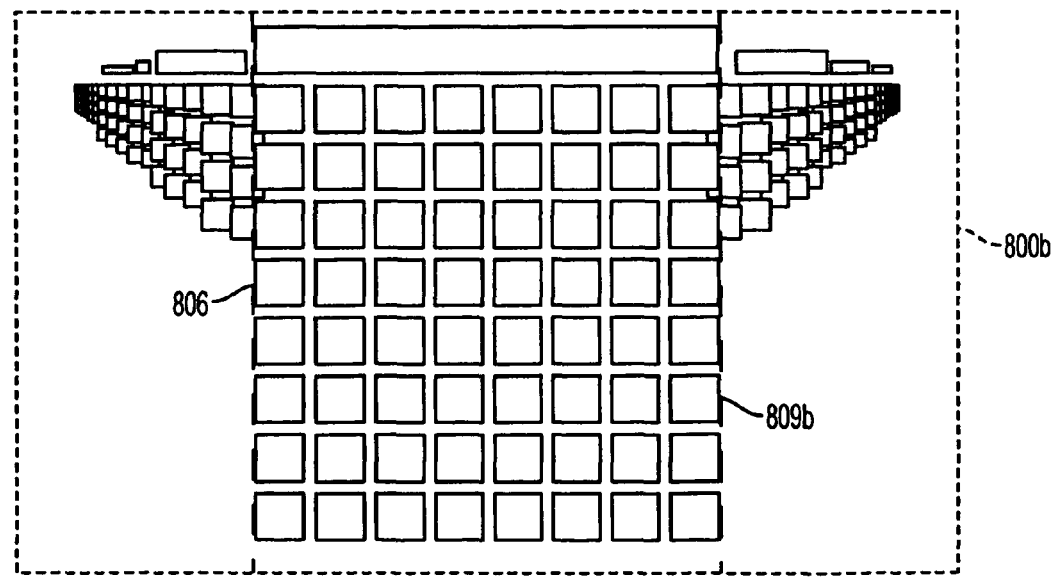

The conceptual camera 506 view discussed above also provides for a zooming effect so that in a focal group 509 with fewer icons 606a, the icons 606a may be larger because the conceptual camera 506 zooms in. In an alternative embodiment, where the focal group may be mobile while the conceptual camera 506 may stay fixed such that the perceived size of the icons 606a is as large as the maximum icon size will allow. In a focal group 509 with a large number of icons 606a, the icons may be smaller because the conceptual camera 506 zooms out in order to capture all of the group member's icons. The net effect of this behavior is that the size of the focal group 509 will remain fairly stable whether there are few or many icons 606a to be displayed, but the size of each icon 606a, while preferably consistent within each focal group, may vary from one focal group to the next. Referring to FIGS. 8a and 8b, two views 800a and 800b are shown. In view 800a, a focal group 809a with sixteen icons 806 representing 16 group items demonstrates a zoomed in effect on a focal group. In FIG. 8b, a view 800b is shown where the view 800b has a second focal group 809b that has sixty-four icons 806 representing 64 group items. In spite of the significant difference in the number of icons 806 between the first focal group 809a and the second focal group 809b, the width of each of the focal groups is substantially the same. This effect is accomplished by utilizing a zooming out camera effect. The focal group headers 802a and 802b located in FIGS. 8a and 8b may have a fixed width as well.

In some aspects of the present invention, there may be a categorizer that creates and manages both the focal group and the various non-focal groups. Thus, the categorizer may be used to divide the folder items into the various groups as indicated by the ordering interval of the ordering attribute. The ordering interval, also called a grouping interval, refers to the measurement that is used to divide the data objects displayed in the GUI into groups. For example, in a view that is a timeline, the ordering interval may be years, months, weeks, days, hours, or some other measurement of time. In an embodiment of the present invention the user may select the ordering interval. Alternatively, the system may use a fixed or default ordering interval, or the system may determine an optimal interval to use based on various group size criteria. For example, in a dynamic timeline view, the interval may be "Months" for a stacked view and "Days" for a single item view. In yet another embodiment, a set-based variable may be used in determining the ordering interval. An algorithm that runs a portion of the data set to determine a smart set of groupings. This smart set of groupings is a set-based variable. For example, in a dynamic timeline view an algorithm may analyze the data and establish some groups according to months, other groups according to years, and other groups according to days based on the time attribute of the data set. In another example, time could be used as a ordering attribute, but the ordering interval could be based upon the number of items in each group.

In yet another embodiment, the categorizer may use an endpoint-based algorithm to determine the ordering interval. FIG. 9 depicts a chart that may be used by an algorithm of an illustrative embodiment to determine an ordering interval and label format based on a timeline endpoint(s). Column 902 indicates the range of time that the timeline being analyzed covers. Column 904 provides the interval that the categorizer chooses if the timeline 500 falls into the range specified in column 902. Column 906 indicates the label that may be applied to the focal grouper header based on the selected interval. While the example provided herein uses time as the ordering attribute, one of skill in the art can appreciate that a similar algorithm may be applied for other ordering attributes such as file type, file name, file owner, document author, or any other file attribute that may be ordered. By way of illustrative example, six rows are presented beneath columns 902, 904, and 906. In the first row 908, where the timeline covers less than one hour, the categorizer may set the order interval at quarter hours, and the label format to show the time range as a first hour/minute combination and a second hour/minute combination. In the second row 910, where the timeline covers greater than one hour, but less than twenty-four hours, the categorizer may set the interval to hours and the label format to a similar hour/minute combination as found in the first row 910. The third row 912 may be applied when the timeline 500 covers greater than twenty-four hours but less than or equal to seven days. In this instance, the categorizer may set the interval to days and the label format may be a single day of the week rather than some range of time and may be placed in the center of focal group heading. Rows 914, 916, and 918 each provide for a longer timeline, respectively, and describe the intervals and labels that should be applied for each. Once the categorizer has divided the groups (e.g. chosen the proper ordering interval), the groups may then be displayed to the user.

There may be situations were a large number of items are eligible to be included in a group. For example, if a timeline 500 covers a span of years, and there are hundreds of items in each year, it may not be possible to display each of the items in the group if the focal group maximum width and minimum icon size limitations are in use. In such a case, the categorizer may split the timeline into more granular groups, or the categorizer may split a group that is otherwise too large into two or more subgroups. In these instances, the focal group header may be updated accordingly. For example, if the timeline 500 is three years long, and the algorithm shown in FIG. 9 is applied to that timeline resulting in a group with 200 items, the number of items in the group may be too large to be displayed on the user interface at one time. The categorizer may then split any oversized group into two or more sub groups and change the focal group header label accordingly. Referring back to FIG. 9, a timeline 500 that is three years long would apply row 918. Thus, the label that is placed in the focal group header is of the format "$Year_1$-$Year_2$". If the number of items in the focal group 509 is too large to be displayed at one time, the categorizer may split the focal group 509. The label may be changed to reflect this split. In one embodiment, the respective labels for each subgroup may be "$Year_1$-$Year_2$-Part 1" and "$Year_1$-$Year_2$-Part 2". As more sub-groups are created, additional labels may be created accordingly.

In other aspects of the invention, the focal group may be limited in size so that the non-focal groups are visible to the user on either side of the focal group. As discussed above, a minimum icon size may also be prescribed so that users are able to decipher the contents of the focal group icons 606a. Icons within the focal group 509 may be ordered according to some ordering criterion. In one embodiment, the items in the focal group will flow from left to right and top to bottom according to the ordering attribute used to create the view. In other embodiments, the icons 606a may flow from right to left and/or bottom to top to accommodate other cultures (e.g. for languages that are read from right to left rather than left to right).

In another aspect of the present invention, the categorizer may determine the number of icons 606a that are in the focal group 509 (or in some cases in each focal group subgroup). The focal group 509 may have a layout that is determined by a mathematical calculation. For example, in one embodiment, the row width (i.e. the number of icons to be placed in each row) of any focal group 509 (or a sub-group of the focal group 509) may be calculated as CEILING(SQRT(N)) where N is the number of icons 606 to be displayed, i.e., the number of focal group or focal subgroup members. In other embodiments, the row width may be calculated as FLOOR(SQRT (N)) where N is the number of icons 606 to be displayed. In still other embodiments, the layout may be determined by some other method of graphic layout design as is known in the art.

Focal Group Animation

According to another aspect of the invention, animation may be used to transition from one focal group to another. The animation described herein may be implemented using various technologies that are known in the art. For example, DirectX® and/or Direct3D® technology can be used to provide 3D animation described herein. Other 3D graphics technologies known in the art may also or alternatively be used. These animation routines may reside as part of the operating system 134, 144, or they may reside independently of the operating system in other program modules 136, 146. They may be stored on hard disk drive 141, nonvolatile magnetic disk 152, optical disk 156 or even on remote computer 181 accessible over local area network 171 or wide area network 173.

Figure 10A:
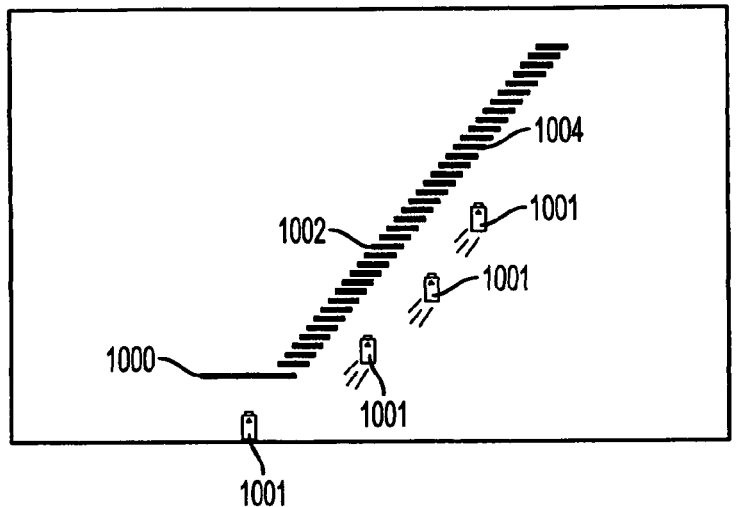
FIGS. 10a, 10b and 10c illustrate a focal group transition according to an illustrative embodiment of the present invention.
Figure 10B:
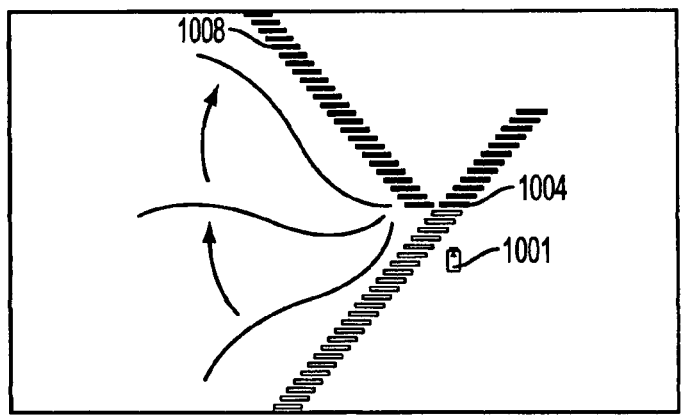

The steps for changing from one focal group to another focal group are demonstrated in FIG. 10. A change in focal group is initiated by a user implementing an actuating method such as clicking on a non-focal group on the timeline or a new position in the histogram (discussed below). When the user selects a new focal group, the system may initiate a series of steps to animate the process of changing focus from one group of icons to another.

Figure 10C:
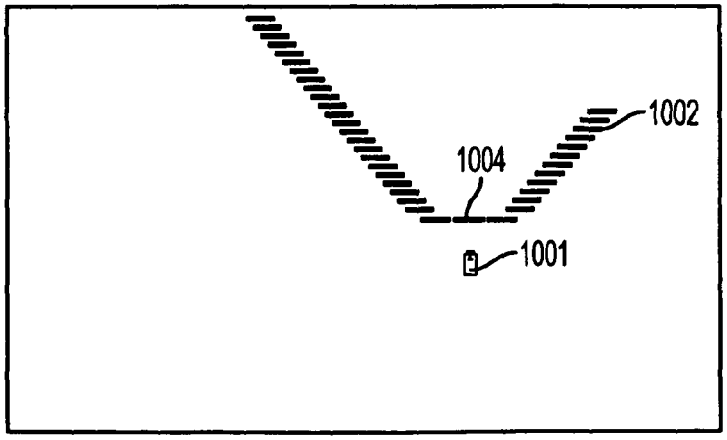

Referring to FIG. 10a, a conceptual diagram presents various aspects of the present invention. A conceptual camera 1001 is focused on a current focal group 1000. Various non-focal groups 1002 are situated behind the current focal group 1000, with each being partially obscured by the focal group in front of it. A new focal group 1004 may be called out by a user. When the user selects new focal group 1004, the conceptual camera 1001 moves from the current focal group 1000 past various other non-focal groups 1002 to the new focal group 1004. As the conceptual camera 1001 is moving, the GUI is updated to reflect the view from the conceptual camera's current position, thus providing an animation sequence as the conceptual camera moves. Referring now to FIG. 11b, once the conceptual camera 1001 is positioned in front of the new focal group 1004, the timeline may bend from its old position 1006 to a new position 1008. Turning now to FIG. 10c, once the timeline has completed repositioning, the conceptual camera 1001 zooms in or out so that the items in the focal group are fully visible and at the forefront of the GUI display.

Focal Group Placement

In the embodiments of the present invention so far described, the focal group has generally been placed in the center of the view. In yet another aspect of the present invention, the focal point may be shifted from the center of the view to one side of the view. Generally, the focal group will be placed so that the maximum number of icons (both focal group icons and non-focal group icons) will be visible to the user. The focal group may be placed in the center of the dynamic timeline view when certain conditions are met. For example, the focal group may be in the center of the view if the number of icons on each side of the focal group is the same or at least meets a minimum threshold, e.g., if the number of icons on both sides of the focal group are of such an amount that they extend beyond the visible area in the dynamic timeline view. In yet another embodiment, the focal group may be centered when all of the icons on either side of the focal group are of an amount that can be displayed such that they can all be seen within the visible area in the view.

Figure 11:
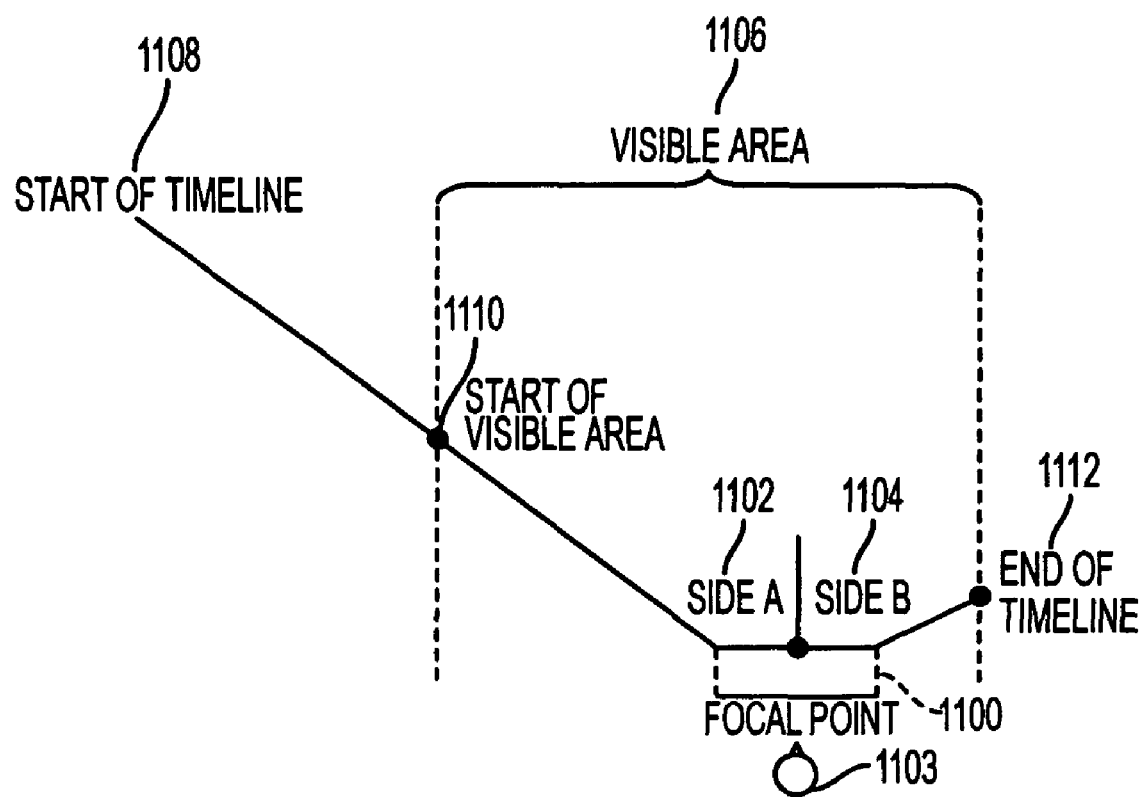
FIG. 11 a focal group situated near one end of a timeline according to an illustrative embodiment of the present invention.

FIG. 11 illustrates a scenario where, according to aspects of the present invention, the focal group might not remain centered in the dynamic timeline view. A focal point 1100 is located on a timeline 1101. The timeline 1101 has a starting point 1108 and an ending point 1111. The timeline 1101 also has a visible area 1106. The visible area 1106 is the area that will be displayed to the user in enough detail for the user to discern the timeline content. The timeline 1101 is further divided into a Side A 1102 and a Side B 1104 on the left and right sides of the focal point 1100, respectively. In this example, the number of icons on Side A is greater than the number of icons on Side B and these icons extend beyond the start of the visible area 1110. Thus, certain icons on Side A are not visible to the user. However, side B contains fewer icons, and as a result, the end of the timeline 1112 falls within the visible area. In order to provide the user with a view of the greatest total number of icons, the focal point may shift to the user's right in the view. The actual ordering interval captured by the focal point does not change. This shifting procedure changes only the location of the focal point 1100 in the dynamic timeline view.

Non-Focal Groups

According to other aspects of the present invention, when a group is not at the focal point (i.e. is not the focal group), it is a non-focal group. Generally, a non-focal group will have certain properties associated with it. For example, in an embodiment where the view is presented with a 3D effect, the non-focal groups will be presented in such a way as to highlight the three dimensions.

Referring back to FIG. 6, the focal group 509 may be placed in the front and center of the GUI view, and may appear to be some distance from the user. Non-focal groups 610a, 610b, 610c, and 610d may be positioned at some horizontal and spatial (in 3D implementations) offset from the focal group and also appear to be less prominent than the focal group. For example, they may be positioned behind the focal group (i.e. somewhat farther in the distance). In order to better simulate a 3D effect, the items in the focal group 509 may cast simulated shadows on the non-focal groups immediately adjacent. Likewise, each non-focal group may cast simulated shadows on elements situated behind it. In one embodiment of the present invention, all of the groups (non-focal and focal) may be aligned vertically. In other words, each of the groups appears to be placed at the same vertical position on the display, regardless of the conceptual camera's present perspective. In other embodiments of the present invention, the non-focal groups may be offset vertically from the focal group and the other non-focal groups. In certain embodiments the non-focal groups may be in focus, allowing the user to more easily select a new focal group from among the non-focal groups in the view. However, as the non-focal groups are set farther and farther away from the focal group 509, the non-focal groups may become blurred, fogged or transparent.

If the number of intervals between a non-focal group and the focal group becomes large, the non-focal group might not be displayed, or it may simply become too small for the user to see on the screen.

Referring again to FIG. 6, four non-focal groups may be observed—two on each side of focal group 509. It may be observed that the top portion of each group is in alignment with the others. Each non-focal group is divided into columns, and may be sorted by the ordering attribute specified for the view. There are two non-focal groups 610*a* and 610*b* that are located one interval from the focal group 509. In an embodiment in which the view is a dynamic timeline view, these non-focal groups contain icons that are the closest in time to the focal group 509. Columns that are further in time from the focal group 509 are placed further away from the focal group both horizontally and spatially (in 3D implementations) so that they appear to be further away in space. Each of the non-focal groups has a non-focal group header (608*a* and 608*b* respectively) that provides information of the group's contents in a manner similar to the focal group header 602 discussed above. Just as the focal group header 602 may be the perceived width of the focal group, the non-focal group header may be the perceived width of the non-focal group.

In some embodiments of the present invention, the non-focal group icons 606*b* (those in the non-focal groups) may be presented as partially obscured by those items in columns closer to the focal group 509. Each column of non-focal group icons 606*b* may be partially obscured by the column immediately adjacent and closer to or in the focal group 509. For example, column 620 is partially obscured by column 618. In other embodiments all icons may be fully displayed.

Figure 12A:
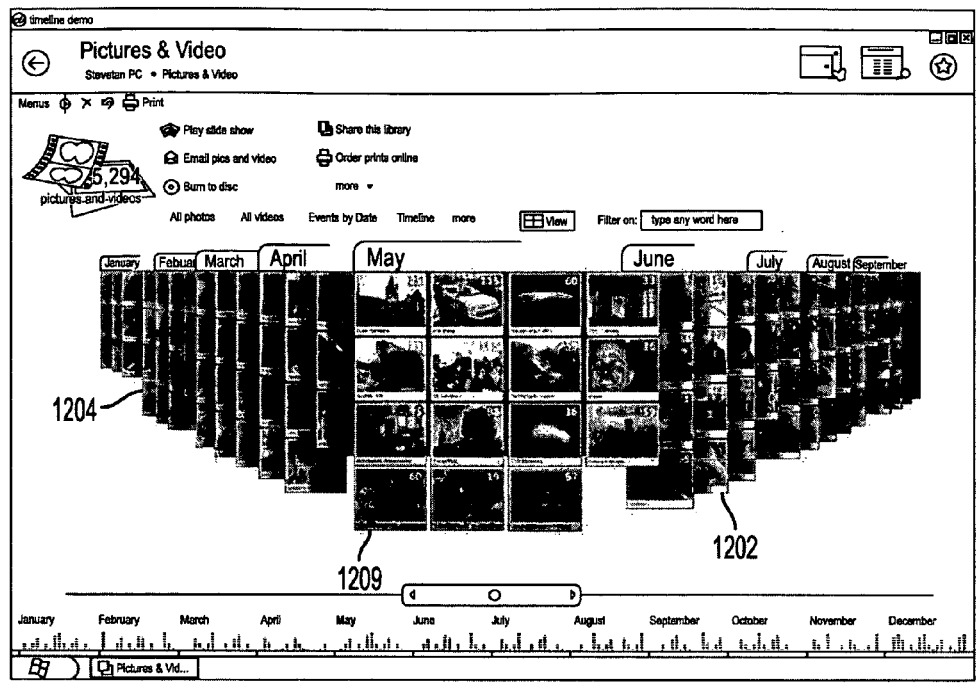
FIGS. 12a and 12b illustrate calling out a non-focal group without changing the focal group according to an illustrative embodiment of the present invention.
Figure 12B:
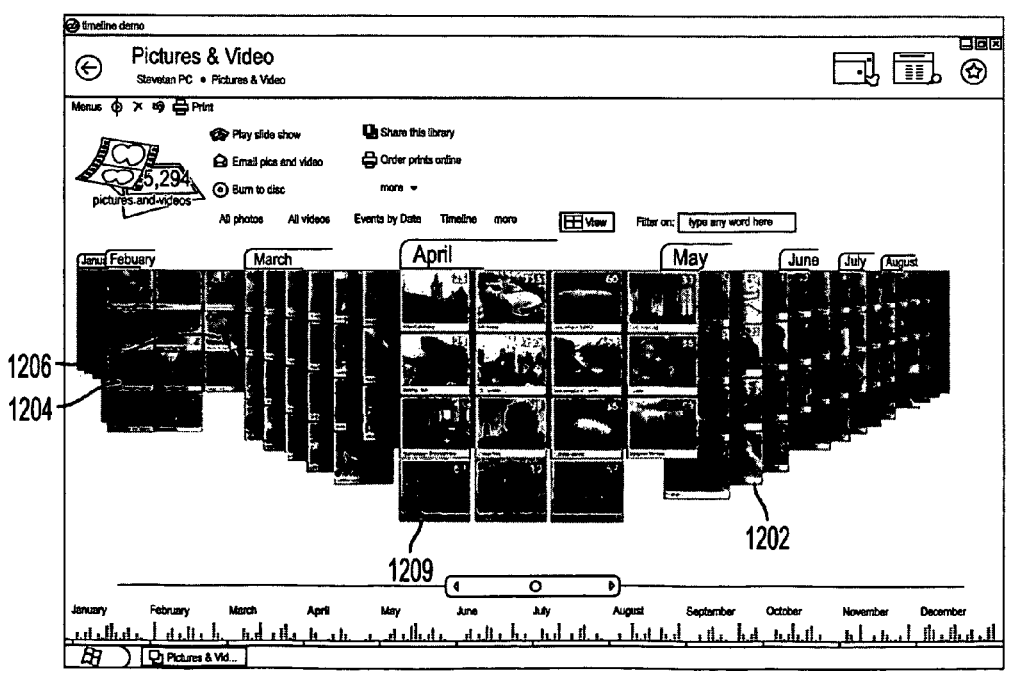

In yet another aspect of the present invention, a non-focal group may be called out without making it the focal group. Referring to FIGS. 12*a* and 12*b*, a dynamic timeline view according to aspects of the present invention is shown. In FIG. 12*a*, the focal group 1209 is the month of April. The non-focal groups 1202 are partially obscured according to aspects of the present invention. If the user wishes to more closely examine the contents of the February non-focal group 1204 without changing the focal group 1209, a mouse pointer 1202 may be moved over the February non-focal group 1204 and left to hover. FIG. 12*b* demonstrates how after a certain period of time of mouse hover, the February non-focal group 1204 may fold out from the other non-focal groups, displaying its icons in their entirety rather than partially obscured as may be the norm.

Histogram

Figure 13:
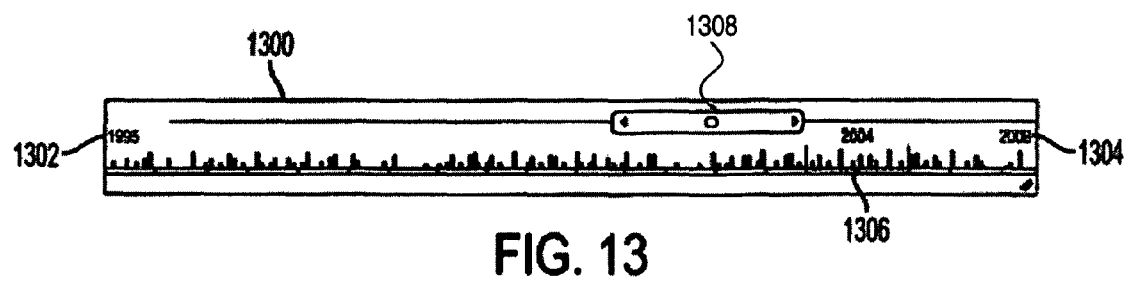
FIG. 13 illustrates a view of a histogram according to an illustrative embodiment of the present invention.

In further aspects of the present invention, a histogram may be provided to allow the user to more easily navigate and change focal groups over the entire timeline, and not be limited to the groups in the visible area of the timeline. FIG. 13 illustrates a histogram 1300 according to an illustrative embodiment of the invention. The histogram may have a range associated with it based on the range of the timeline or the contents of the present view. In an embodiment where time is the ordering attribute, the range may be the minimum date to the maximum date of the timeline. In FIG. 13, the start date 1302 is the year 1995 and the end date 1304 is the year 2008. A user may select an interval to force the GUI display to immediately jump to the selected group.

According to an aspect of the invention, the histogram may be laid out in a series of columns where there is a single column for each histogram interval. Each column may have a height associated with it, indicating an amount of data falling within that interval. In one embodiment, a series of bars 1306 are used to represent the number of files in the interval represented by the column relative to the number of files in other intervals. The height of the bars 1306 may be calculated by finding the interval with the most files and assigning its representation a height of ten bars. Based on this maximum height, each of the other columns may be assigned a number of bars based on the following equation:

Num Bars=CEILING(10[Num Files in Current Column]/[Num Files in Max Column])

For each view presented to the user according to aspects of the present invention, an interval may be chosen for the histogram 1300. The interval for the histogram may be selected to fill the bottom of the view with as many logical columns as possible. In some embodiments, the interval for the histogram may be a fixed value (e.g. it may represent a fixed amount of time). The interval for the histogram will not necessarily be the same as the interval for the focal and non-focal groups (i.e. the ordering interval).

According to aspects of the present invention an initial calculation may be used to determine a value C that may then be used to determine the appropriate histogram interval. This calculation may take the form of:

$C$=[Total Range Covered by Histogram]/[# Columns that Can Fit in View]

If for example, a range of 13 years is covered by the histogram 1300, and the view can fit 100 columns, then the system may perform the following calculation:

$C$=[13 years]/[100 Columns]=0.13 Years=47 days

Referring back to FIG. 9, a chart that maps C values to histogram intervals is shown. Although the chart in FIG. 9 may also be used to calculate ordering interval for the dynamic timeline view, it may be appreciated by one of skill in the art that the methods used to calculate the histogram interval may differ from the methods used to calculate the histogram interval. In this example, because the C value is 47 days, the selected histogram interval would be months. Thus, for each month in the time range, a bar may be placed on the histogram with its height set according to the number of files in that interval.

A user may interact with the histogram 1300 in several ways. Hovering a mouse pointer over a column may cause a tool tip showing the range covered by that column to appear. The format of the tool tip may be based on the histogram interval. The histogram 1300 may also be used to change the focal group. In one embodiment, clicking on a column brings the represented range forward as the focal group in the view. In the case of a dynamic timeline view, clicking a column may cause the system to change the focal group from the current focal group (if different from the newly selected focal group) to the new focal group, optionally using animation as described above.

Figure 14:
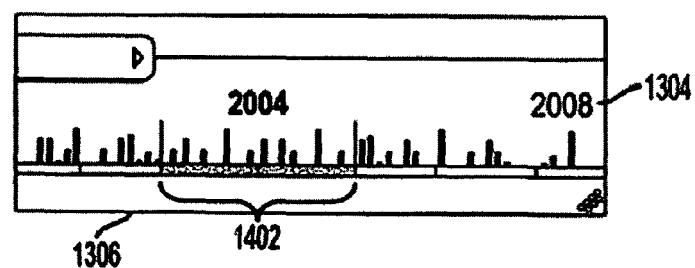
FIG. 14 illustrates a partial view of the histogram in FIG. 13 according to an illustrative embodiment of the invention.

Because the histogram interval is not necessarily identical to the ordering interval for the dynamic timeline view, rules may be created to handle situations where the interval of the histogram and the interval of the view differ. In one embodiment, a three-rule system may be used to handle changing the focal group based on a user clicking on the histogram. First, if the interval of the histogram 1300 is equal to the interval of the view, then clicking on a column of the histogram may change the focal group 509 to the exact group represented by the column in the histogram. Second, if the interval of the histogram is larger than the interval of the view, then clicking on a column in the histogram may cause the focal group 509 to be the first interval of the view represented by that column. Finally, if the interval of the histogram is smaller than the interval of the view, then clicking on a column in the histogram may cause the focal group 509 to be the interval that contains the time represented by the selected column. Referring now to FIG. 14, once the user has selected a new focal group on the histogram, the set of intervals 1402 on the histogram that the focal group covers will be highlighted and labeled with the a label similar to the focal group label.

Jog Control

Another aspect of the invention provides a jog control for scrolling through the intervals of the dynamic timeline view. Referring back to FIG. 13, a jog control 1308 is present. In this particular embodiment, the jog control is presented as a scrolling bar located above the histogram 1300. However, jog control 1308 may be placed elsewhere on the interface (e.g. above the timeline view), and may take a different shape than shown in FIG. 13. The jog control 1308 may be dragged in a certain direction using a mouse or some other device. When the jog control is moved in a direction, the system responds by causing the conceptual camera that is focused on the focal group to begin moving along the dynamic timeline view as described in the section on Focal Group Animation above. As the jog control is pulled further away from its original position, the conceptual camera moves away from the focal group at a faster speed. When the conceptual camera reaches the end of the dynamic timeline view, or when the user releases the jog control 1308 which causes it to return (or snap back) to its original position, the conceptual camera will stop moving, and the interval over which it is located will become the new focal group.

Other Input Devices

Although the present invention has been described in terms of an interface that is manipulated by a mouse or some other pointing device as known in the art, it can be readily appreciated that other input devices can be used to manipulate and control the dynamic timeline view. For example, a keyboard implementation may be provided. Pressing the Page Up key may cause the focal group to shift to the first non-focal group on the left, while pressing the Page Down key on the keyboard may cause the focal group to shift to the first non-focal group on the right. The End key may be used to shift the dynamic timeline view focal group to the oldest time interval, while pressing the Home key could shift the dynamic timeline view to the most recent time in the view.

Further, a user may be able to manipulate and control the dynamic timeline view by rotating a scroll wheel on a mouse, keyboard, or other computer input device. For example, backward rotation of the scroll wheel may cause the focal group to shift to the first non-focal group on the left (e.g., backwards in time), and forward rotation of the scroll wheel may cause the focal group to shift to the first non-focal group on the right (e.g., ahead in time).

The displays of the dynamic timeline view shown in FIGS. 4, 6, 8a, 8b, 12a and 12b are exemplary graphical presentations. A limitless number of graphical presentations can be made. For example, any desired shape and relative size of the icons, header, and groups may be used. Further, a whole host of different graphical presentation may be used to make the focal group more prominent than the non-focal groups in the relative positioning of the focal group to non-focal groups. Moreover, the focal groups and non-focal groups may be graphically depicted by numerous different techniques. Other view may be available such that the dynamic timeline may be viewed from any perspective allowed in a physically modeled 3D or simulated 3D environment.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A computer-implemented method for displaying a set of items on a graphical user interface according to a attribute of each item of the set, wherein the attribute can be ordered, comprising:

determining an ordering interval for a plurality of items by dividing a total range covered by a histogram by a quantity of columns that can fit within a portion of the graphical user interface;

dividing the plurality of items into a plurality of ordered groups based on the ordering interval and the attribute;

determining a focal group from the plurality of ordered groups;

ordering the ordered groups into a histogram view;

displaying the focal group at a point of primary focus;

displaying with less prominence than the focal group on a first side of the focal group and in decreasing prominence away from the focal group, a first group of images that precede the focal group;

displaying on the graphical user interface with less prominence than the focal group on a second side of the focal group and in decreasing prominence away from the focal group, a second group of images that follow the focal group, the images in the second group being sized smaller than the images in the focal group;

displaying with less prominence than the second group of images, a third group of images so that the images in the third group are sized smaller than the images in the second group; and without changing the focal group, folding out a selected non-focal group from the ordered groups that are non-focal and displaying items of the selected non-focal group in entirety, rather than being partially obscured.

2. The computer implemented method of claim 1, wherein the first side of the focal group is one of a left side and a right side of the focal group, and the second side of the focal group is the other of said left side and right side.

3. The computer implemented method of claim 1, wherein the first side of the focal group is one of a top side and a bottom side of the focal group, and the second side of the focal group is the other of said top side and said bottom side.

4. The computer implemented method of claim 1, wherein the set of items represent graphical image files.

5. The computer implemented method of claim 1, wherein the attribute corresponds to when each item was created.

6. The computer implemented method of claim 5, wherein the attribute corresponds to a date a picture was taken.

7. The computer implemented method of claim 1, wherein the focal group, the first plurality of groups of images, and the second plurality of groups of images are displayed in a three-dimensional representation.

8. The computer implemented method of claim 1, wherein the graphical user interface simulates 3D in a 2D graphical environment, as displayed on a display device.

9. The computer implemented method of claim 1, further comprising:

receiving user input selecting an item from a non-focal group;

determining the non-focal group from which the item was selected to be a new focal group instead of the original focal group;

transitioning the graphical user interface to display the new focal group at the point of primary focus of the graphical user interface, to display, with less prominence than the new focal group, at least one group that precedes the new focal group, on the first side of the new focal group, and to display, with less prominence than the new focal group, at least one group that succeeds the new focal group, on the second side of the new focal group, wherein the transitioning step comprises animating the graphical user interface to move the ordered groups.

10. The computer implemented method of claim 1, wherein the step of displaying the focal group at a point of primary focus of the graphical user interface comprises sizing the focal group to consume a predetermined amount of the graphical user interface space.

11. The computer implemented method of claim 10, wherein the predetermined amount comprises a range of approximately fifty to seventy percent of a width of the graphical user interface.

12. The computer implemented method of claim 10, wherein the step of displaying the focal group at a point of primary focus of the graphical user interface comprises sizing items of the focal group such that all the items fit within the predetermined amount of the graphical user interface space.

13. The computer implemented method of claim 10 further comprising:
    determining whether all the items fit within the predetermined amount of the graphical user interface space when each icon has a predetermined minimum size;
    dividing the focal group into a plurality of sub groups and displaying a first subgroup of the plurality of subgroups as the focal group if the icons do not fit within the predetermined amount of the graphical user interface space.

14. The computer implemented method of claim 13, wherein the predetermined minimum size is pixel-based.

15. The computer implemented method of claim 14, wherein the predetermined minimum size comprises 24 pixels by 24 pixels on a 96 dots per inch (dpi) display device, or a substantially equivalent size on a non-96 dpi display device.

16. The computer implemented method of claim 1, wherein displaying on the graphical user interface at least one group that precedes the focal group comprises displaying the at least one group that precedes the focal group to appear receding backwards from the focal group.

17. The computer implemented method of claim 1 further comprising displaying on the graphical user interface a jog control which, when moved, causes the ordered groups to shift correspondingly with the jog control causing the focal group to become a new non-focal group and a non-focal group to become a new focal group.

18. One or more computer storage media storing computer executable instructions for performing a method for displaying group of items on a graphical user interface according to a common attribute of each item of a set, the method comprising:
    determining an ordering interval for a plurality of items by dividing a total range covered by a histogram by a quantity of columns that can fit within a portion of the graphical user interface;
    dividing the plurality of items into a plurality of ordered groups based on the ordering interval and the common attribute;
    determining a focal group from the plurality of ordered groups;
    retrieving a predetermined width ranging between fifty to seventy percent of the graphical user interface for displaying the focal group;
    ordering the ordered groups into a histogram view;
    organizing thumbnails of items in the focal group into a representation that fits within the predetermined width;
    displaying the focal group at a point of primary focus and within the predetermined width;
    displaying with less prominence than the focal group on a first side of the focal group and in decreasing prominence away from the focal group, a first plurality of groups of images that precede the focal group;
    displaying on the graphical user interface with less prominence than the focal group on a second side of the focal group and in decreasing prominence away from the focal group, a second plurality of groups of images that follow the focal group; and
    without changing the focal group, folding out a selected non-focal group from the ordered groups that are non-focal and displaying items of the selected non-focal group in entirety, rather than being partially obscured.

19. One or more computer storage media storing computer executable instructions for generating a user interface for displaying items comprising:
    a first set of items comprising a focal group;
    a plurality of sets of items, which are related to the first set of items and presented in a histogram, comprising a plurality of non-focal groups of images, the images displayed with decreasing prominence away from the focal group in array orientations of the images, wherein images in each non-focal group are displayed in smaller sizes than images in non-focal groups closer on the histogram to the focal group, and further wherein without changing the focal group, a selected non-focal group is folded out from the non-focal groups and images of the selected non-focal group are displayed in entirety rather than being partially obscured; and
    a jog control that when moved to a side causes the focal group to become a non-focal group and a jog control selected non-focal group to become the focal group, wherein the focal group and the plurality of non-focal groups are positioned according to an ordering attribute that exists in the focal group and the non-focal group.

20. A method for displaying a plurality of items on a graphical user interface, comprising:
    organizing the plurality of items into groups of two-dimensional arrays based on time;
    sizing each item in a group based on the distance the group is from a focal group;
    displaying the items in the groups on the graphical user interface, the items being displayed with differing prominence away from the focal group; and
    without changing the focal group, folding out a selected non-focal group from the groups that are non-focal and displaying items of the selected non-focal group in entirety, rather than being partially obscured.

* * * * *